United States Patent [19]
Katahira et al.

[11] 3,913,868
[45] Oct. 21, 1975

[54] TAPE TAKE-UP DEVICE

[75] Inventors: Yukio Katahira, Tokorozawa; Seiichi Saito, Iruma, both of Japan

[73] Assignee: Nihon Beru-Haueru Kabushiki Kaisha, Higashimurayama, Japan

[22] Filed: Aug. 28, 1974

[21] Appl. No.: 501,396

[30] Foreign Application Priority Data
Aug. 28, 1973 Japan............................ 48-100769

[52] U.S. Cl.............................. 242/201; 64/30 LB
[51] Int. Cl.².................. G03B 1/04; G11B 15/32; F16D 17/02
[58] Field of Search.......... 242/46.2, 46.4, 200–207; 192/107 M, 113; 64/30 R, 30 C, 30 LB

[56] References Cited
UNITED STATES PATENTS
3,664,472  5/1972  Martini et al. ................. 192/107 M
3,681,940  8/1972  Albrile ............................... 64/30 C

*Primary Examiner*—Leonard D. Christian
*Attorney, Agent, or Firm*—John E. Peele, Jr.

[57] ABSTRACT

Disclosed is an improvement in a take-up assembly for smoothing the operation of a tendency driven take-up for winding an elongated web which is transported toward the take-up at a controlled rate less than the maximum rate of the take-up device, by interposing solid lubricant discs between driving and driven components so that slip-stick action is substantially eliminated.

5 Claims, 5 Drawing Figures

(PRIOR ART)

TAPE TAKE-UP DEVICE

The present invention relates to an improvement in smoothing the operation of a take-up assembly of a web handling apparatus for transporting a film or tape, and more particularly relates to the improved take-up assembly as applied to a motion picture camera in which film is intermittently transported toward a tendency driven take-up.

In a motion picture camera, an elongated film is intermittently transported by a shuttle to and from an exposure aperture. The length of film at the aperture is stopped during the period of exposure while previously exposed film is transported to a film storage chamber of the camera or a cartridge. The film is wound in the storage chamber by a take-up shaft or hub drivably rotated by a take-up claw or pawl which is tendency driven by a continuously operated driving means such as a motor.

As film is transported in a camera from a supply past the exposure aperture, and to the take-up, the film not yet transported by the shuttle must be prevented from being advanced. Thus, the force from the driving means must be limited or isolated as appropriate between the driving means and the take-up pawl whch drives the take-up hub. This isolation is necessary to avoid the detrimental effect due to the increased force of take-up inertia through the increase of diameter of the wound film. Nevertheless, the exposed film must be wound onto the take-up under substantially constant tension from beginning to end of the film's length.

To provide isolation of forces between the hub drive of the take-up and the take-up driver and to smooth the application of torque to the take-up hub, a lubricant, such as a heavy grease, has been applied between a pair of sliding surfaces of the take-up in prior art arrangements. Because of the fluidity of such lubricants, the grease remains only in recesses and not on raised portions which engage one another when the cooperating surfaces are uneven. Hence, uneven acceleration and deceleration of the take-up assembly occurs. Also, high torque peaks often occur tending to stretch the film or tape before the take-up starts or before it stops if operating to wind film. Further, to manufacture the surfaces to extremely close tolerances of constant flatness in quantity production would raise the cost of manufacture. Also, the liquid lubricants often leak, into other portions of the camera.

To overcome the problems associated with the use of fluid lubricants between engaging surfaces of take-up drive components, a solid lubricant is interposed between the engaging surfaces. Typically, such solid lubricants may be selected of thermoplastic resins, available under various trade names and trademarks, such as Teflon, a fluorocarbon resin; nylon, a polyamide; Delrin, an acetal resin; or Nylatron, nylon combined with molybdenum disulfide. Such thermosetting resins act as solid lubricants which do not overflow or leak into other portions of the device. By inserting a solid lubricant, preferably Teflon, formed for example as a disc, between relatively slidable surfaces, a smooth slipping action occurs between the surfaces when the take-up device is started and stopped. Whether the adjacent surfaces are even or uneven, the solid lubricant components conform to the adjacent surface and perform efficiently as intended. In existing cameras using liquid lubricants, the torque levels vary as the quantity of lubricant shifts between raised portions of an uneven surface to valleys between those portions. Hence, differences between the relative movements of the surfaces with and without lubrication cause the surfaces to move with a stick-slip action. By substituting a solid lubricant for the liquid lubricant, the stick-slip action is essentially eliminated thereby reducing the defects occasioned by a rise in initial torque during starts and stops in the existing devices. The solid lubricant maintains the torque required to advance and wind the film, yet limits the torque force from the motor by permitting slippage to occur when the film is intended to be wound after it has been transported by the shuttle. Further, since the solid lubricant can be shaped, substantially as desired, such as a disc, it can be easily and quickly assembled by locating it on the shaft supporting the take-up drive member.

To extend the life of the solid lubricant members, selected of the surfaces of components cooperating with the members are roughened slightly by chemical or mechanical methods. The roughened surfaces when engaged by the lubricant members reduce significantly if not totally preclude relative slippage therebetween. In this manner, the members are not worn by slippage against more durable metal components. Thus, where required for longer instrument life, metal or polycarbonate components can be used without losing the benefits of the reduced slip-stick action obtained by the use of solid lubricant members.

A principle object of this invention is to provide an improved take-up assembly for a tape, web, or film handling device, the assembly operating smoothly without stick-slip action during starting and stopping of the take-up assembly due to interposition of solid lubricant members between drivable components.

The above and other objects will become apparent from the description of the accompanying drawings in which like parts are designated by like numerals.

Figure 1:
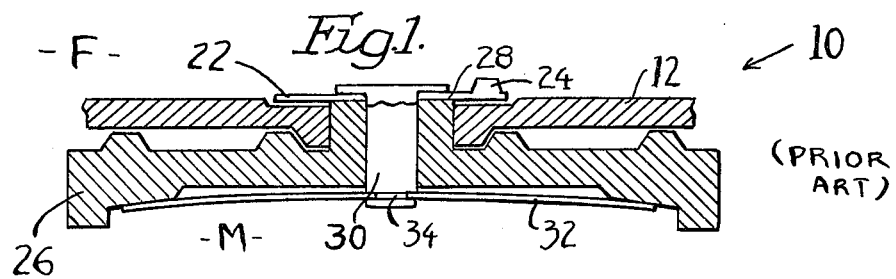
FIG. 1 is a sectional view of a take-up assembly according to the prior art.

Referring now to FIG. 1 of the drawings, a take-up assembly 10, of a tape handling instrument for transporting a tape such as film or magnetic tape is shown. The assembly described with respect to a not shown motion picture camera ia arranged in a housing wall 21 which separates a film, tape, or web chamber F and a mechanism chamber M in which a not shown driving means, such as a motor, and drive transmission are enclosed. Extending into the film chamber F is a take-up pawl mounting disc member 22 from which a pawl portion 24 is formed to engage in the hub of a film take-up cartridge or reel (not shown). A film take-up drive gear 26 is provided in the mechanism chamber M, and is rotated by the not shown driving means. The take-up pawl 24 and the drive gear 26 are connected by a shaft 30 frictionally coupling the pawl member 22 and the drive gear 26. The torque transmitted to the take-up pawl is adjusted by a spring 32 which is fixed in a slot 34 about the internal or mechanism chamber end of the shaft 30, and the mechanism chamber side of the drive gear 26. The force of the spring creates a friction force between the head 36 of the shaft 30 the pawl mounting disc 22 and an end bearing surface 28 of the drive gear 26 as the spring biases the shaft inwardly of the mechanism chamber.

During camera operation, the take-up drive gear 26, continuously rotated by the not shown motor, turns the take-up pawl 24 through the shaft 30. When film is available for winding up by the take-up, the take-up is rotatable to drive the take-up hub. If the film winding force through the take-up pawl is increased when the film transported by the shuttle has been advanced onto the take-up, the film may be damaged or pulled through the exposure gate if the pawl is directly driven. However, due to slippage between the pawl and the shaft, the friction therebetween is overcome permitting the pawl to be held by the hub against rotation without creating excessive torque levels causing damage to the film. Hence, a slipping action for the take-up is desired so that the pawl can be stopped when a higher level or stronger torque is applied to the take-up pawl through the continuously driven take-up assembly. To enhance this action, fluid lubricants have been introduced between selected of the relatively rotatable components of the take-up assembly.

With fluid lubricants, the initial torque before slippage occurs tends to be large as the static friction on the sliding surface of the pawl mounting disc, the shaft, and the take-up gear, which may be made of metal or polycarbonate, is larger than the dynamic friction therebetween. This causes the film which has not been transported by the shuttle to be pulled by the take-up pawl because the take-up torque increases significantly due to the increase in the inertia of film when the camera operational rate is increased from normal speed (e.g., 18 FPS) to a higher speed (e.g., 24 or 36 FPS). Hence, undesired variations in the take-up rate and the tension of film being wound often occur.

In preferred embodiments, according to the present invention the take-up assembly is modified by insertion of solid lubricant components, such as discs or rings, between selected of the relatively rotatable components. Preferably the solid lubricant is selected of a thermoplastic resin such as Teflon, which exhibits an exceptionally low coefficient of friction in non-lubricated applications especially at low surface velocities. The coefficient of friction increases rapidly with increasing sliding speeds under pressure conditions contemplated. This pattern of behavior prevents "stick-slip" tendencies. During the anticipated life of the instrument, these solid lubricant components will retain their friction characteristics thereby continuing to be effective. The friction forces between these solid lubricant materials and the metal components with which they engage, cooperate for a smooth transfer of torque without an increase of an initial torque level until break-away occurs. Further, the friction maintains a level of torque that can wind film, yet which permits relative slippage when the torque requirements exceed this level. Thus, when film is available to be wound by the take-up assembly, such winding action occurs. Yet, when the film is restrained against movement as by the shuttle during an exposure sequence, the torque requirement level exceeds the transmission level causing slippage to occur between components of the take-up assembly. Hence, the film is not stretched, torn, or pulled inadvertently through the exposure aperture although the take-up assembly is continuously powered during camera operation.

Figure 2:
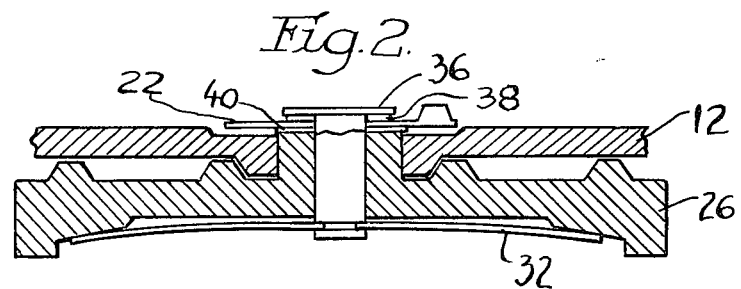
FIG. 2 is a sectional view of a take-up assembly incorporating solid lubricant components according to this invention.

In FIG. 2, a solid lubricant, configured as a ring 38, is inserted between the bottom of the flat head 36 on the shaft 30 and the proximate surface of the pawl mounting disc 22. Additionally, another solid lubricant component of similar ring like configuration 40 is inserted between the opposite surface of the pawl mounting disc 22 and the adjacent surface of the take-up gear 26. The solid lubricant rings 38, 40 engage the respective sliding surfaces of the cooperating components to provide smooth slipping action between the components. Since the surfaces need not be as smooth as with surfaces between which liquid lubricant is to be introduced, the cost of fabrication may be reduced to the acceptability of grosser tolerances. Further, assembly is quite efficient since the rings are easily and quickly arranged between other components and inserted over the shaft 30 for final assembly.

Figure 3:
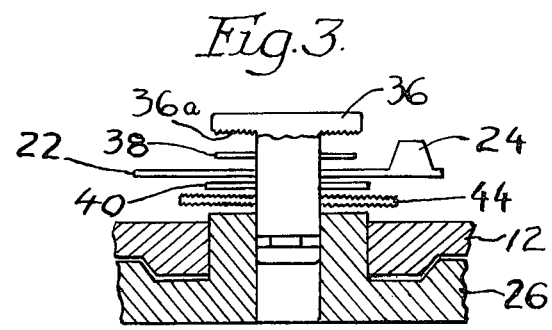
FIG. 3 is an exploded sectional view of a modified embodiment of a take-up assembly according to this invention.

Another embodiment is shown in exploded form in FIG. 3 with surfaces of selected components roughened slightly by chemical or mechanical methods to provide greater control over the friction levels between the components and the solid lubricant rings. The lubricant ring proximate surface of shaft head 36 is shown roughened at 36a to reduce the slippage between the shaft 30 and the lubricant member 38 while permitting unrestrained relative movement between that member and the pawl mounting disc 22. Additionally, a metal washer 44 with roughened surfaces is introduced between the end bearing surface 28 of the drive gear 26 and the adjacent lubricant ring 40. As with the pawl mounting disc 22, the lubricant member provides a limit on the friction between the elements with the pawl being restrained with lower friction than the roughened surfaces with which the other surfaces are engaged. Effectively, the roughened surface, as on the inner flat surface of the shaft head, causes the lubricant member to be locked to that shaft for rotation therewith. Similar locking contact of the second lubricant member with the metal washer causes locking therewith to the driving gear 26. The metal washer reduces wear of the lubricant member by precluding rotation of the member relative to the smaller diameter rim surface of the gear. In addition to the locking action of the washer relative to the gear rim, the washer performs the additional function of increasing the effective bearing surface of the disc so that the relatively small surface of the gear cannot cause the degree of wear on the relatively softer TEFLON disc as might occur by direct contact of the disc on the rim surface.

The pawl mounting disc 22 is stacked on the shaft 30 between the lubricant rings 38, 40. When the shaft is tightened by the assembly of the spring 32 in the cutouts 34 of the shaft end, the pawl disc is restrained against free rotation between the lubricant ring members. However, due to the low friction of the smooth surfaces of the pawl mounting disc, rotation of the gear is transmitted to the pawl 24, so long as the holding or drag torque applied to the pawl is not exceeded. That is, when film is available to be wound by the take-up, the pawl is restrained only slightly by the friction of the film take-up hub. However, when film has not been advanced and is not available to be wound on the take-up, the drag torque is increased sufficiently to exceed the drive friction is exceeded, the pawl mounting disc stops rotating nothwithstanding that the remainder of the take-up assembly continues to rotate. This condition continues until the shuttle or other controlled transport makes available an additional length of film to be wound onto the take-up.

By the action of the lubricant ring members 38, 40, the pawl mounting disc 22 is driven at substantially the same rate as the take-up assembly. As the drag force caused by film unavailability increases the torque, the pawl mounting disc is braked slowly causing slippage relative to the ring members. The slow slip rotation start-up causes the disc-ring member friction to be overcome without requiring that a high torque level be reached. Similarly, as the pawl is released for further rotation, the torque is decreased causing a soft stopping of the relative rotation between the disc and the ring members. The soft stop and start of film wind-up reduces the likelihood of damage to the film.

Figure 4:
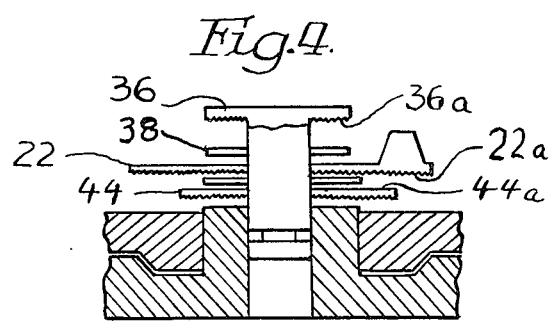
FIG. 4 is an exploded sectional view of yet another embodiment of a take-up assembly according to this invention.

The take-up assembly embodiment of FIG. 4 is similar to the embodiment of FIG. 3. However, different surfaces are selected to be roughened including one surface 22a of the pawl mounting disc 22. The lower surface 36a of the head 36 of the shaft 30 is roughened to engage the upper lubricant ring member 38. The lower surface of the washer 44 is roughened to engage the adjacent rim surface of the drive gear. The opposite surface 44a of the washer is maintained smooth to enable rotation of the lubricant ring member 40 relative thereto. In this arrangement, the pawl mounting disc 22 rotates relative to the upper lubricant ring 38 but relative to the metal washer 44. Functionally, the results are substantially the same as with the arrangement of FIG. 3.

Figure 5:
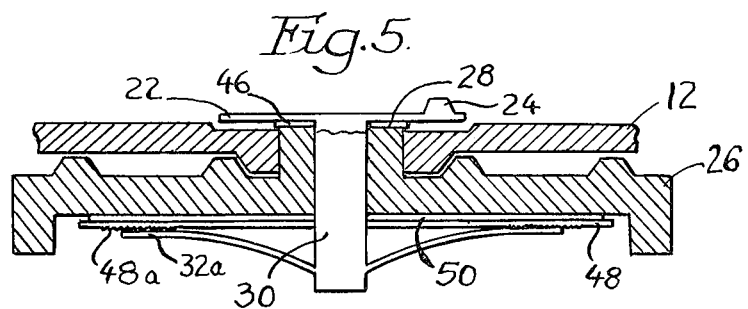
FIG. 5 is a sectional view of still another embodiment of a take-up assembly according to the present invention.

Yet another modification of the take-up assembly 10 is shown in FIG. 5. In this arrangement, the pawl mounting disc 22 is formed integral with the shaft 30 in place of the flat head 36. Assembled under the pawl mounting disc 22 and over the rim surface 28, of the drive gear 26 is a lubricant ring member 46. Below the drive gear 26 and interposed between the lower surface thereof and a relatively large metal washer 48 is another solid lubricant ring 50. The surface of the washer 48 engaging the ring 50 is smooth while the opposite surface is roughened at 48a. The roughened surface is engaged by similarly roughened surfaces of the shaft restraining spring 32a. The function of this embodiment is similar to the function of the embodiments of FIGS. 3 and 4 as to relative slippage during pawl start-up and slow-down.

It is to be understood that the embodiments shown are illustrative of the arrangements of take-up assemblies according to the invention, and that certain changes, alterations, and modifications can be made without department from the scope of the invention.

What is claimed is:

1. In a take-up assembly for an apparatus handling an elongated web to be wound from a controlled transport onto a take-up by a continuously driven take-up assembly, the improvement comprising:
   a rotating driving means;
   a first rotatable member driven by said driving means;
   means biasing said first rotatable member into frictional engagement with said driving means;
   a second rotatable member driven by said first rotatable member by friction;
   a solid lubricant member interposed between said first and second rotatable members to prevent stick-slip action from occuring between said relatively rotatable members when one of said rotatable members is restrained or released by transport of a length of web to said take-up assembly by controlled transport, and
   a metal washer interposed between one of said rotatable members and said solid lubricant member to reduce wear of said solid lubricant member due to relative rotation of said rotatable member and said solid lubricant member.

2. An improvement in a take-up assembly as in claim 1 wherein said solid lubricant member is a thermoplastic resin such as a fluorocarbon resin.

3. An improvement in a take-up assembly as in claim 1 wherein at least one of said rotatable members is provided a roughened surface to cause rotation of said solid lubricant member therewith, said opposite surface of solid lubricant member engaging a non-roughened surface of said other rotatable member.

4. In a take-up assembly for an apparatus handling an elongated web to be wound from a controlled transport onto a take-up by a continuously driven take-up assembly, the improvement comprising:
   a rotating driving means;
   a first rotatable member driven by said driving means;
   means biasing said first rotatable member into frictional engagement with said driving means;
   a second rotatable member driven by said first rotatable member by friction;
   a pawl disc drivable by said rotatable members; and
   at least two solid lubricant members configured as rings formed of a thermoplastic resin such as a fluorocarbon resin are interposed between said first and said second rotatable members and said pawl disc to prevent stick-slip action from occuring between said relatively rotatable members when one of said rotatable members is restrained or released by transport of a length of web to said take-up assembly by controlled transport, and at least one of the surfaces of said rotatable members is provided a roughened surface to cause rotation of said solid lubricant member therewith, said opposite surface of said solid lubricant member engaging a non-roughened surface of said other rotatable member.

5. An improvement in a take-up assembly as in claim 4 wherein a metal washer and at least two solid lubricant members configured as rings formed of a thermoplastic resin such as a fluorocarbon resin are interposed between said rotatable members and said pawl disc, and at least one of the surfaces of said rotatable members is provided a roughened surface to cause rotation of said solid lubricant member therewith, said opposite surface of said solid lubricant member engaging a non-roughened surface of said other rotatable member.

* * * * *